UNITED STATES PATENT OFFICE.

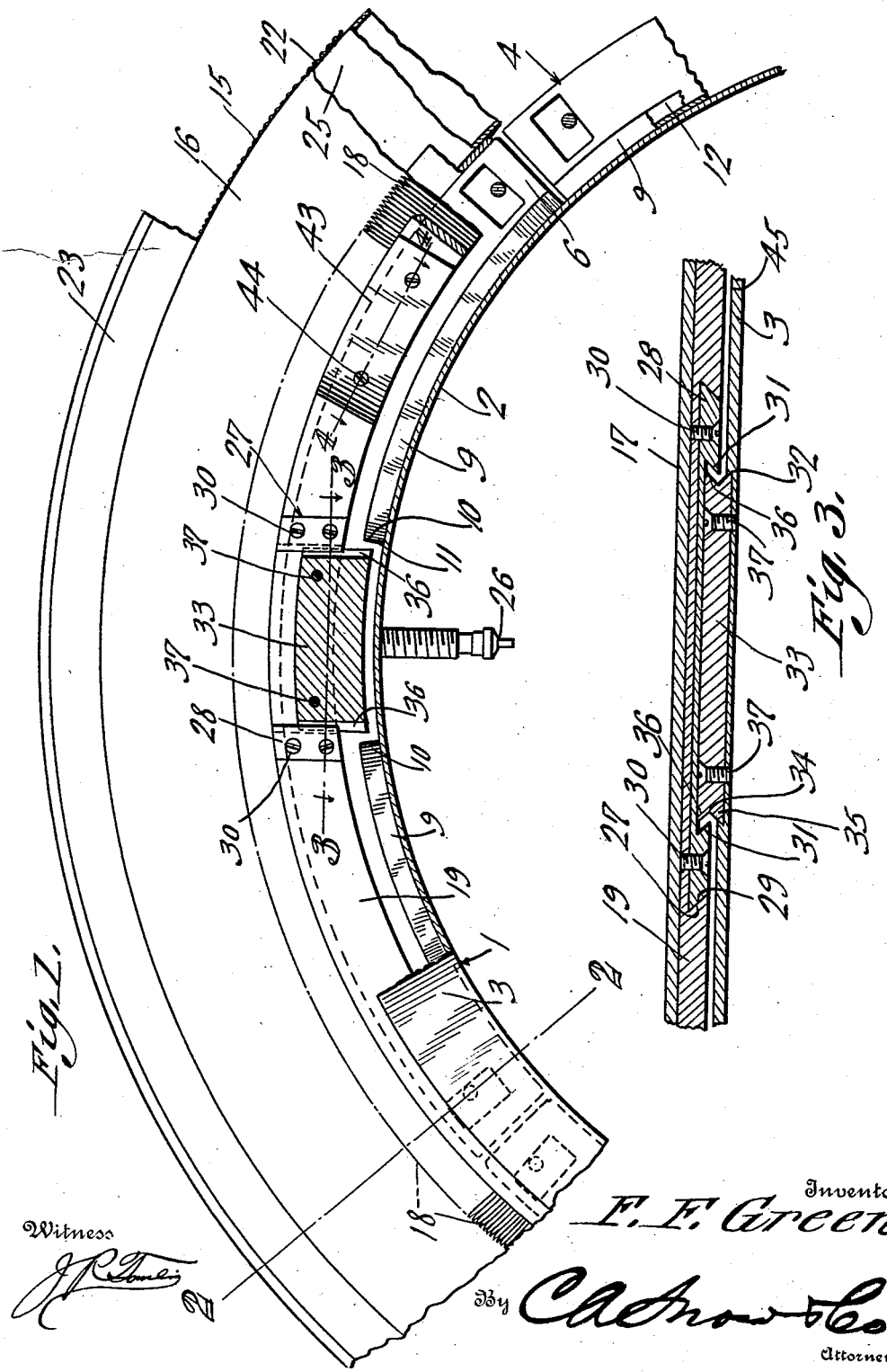

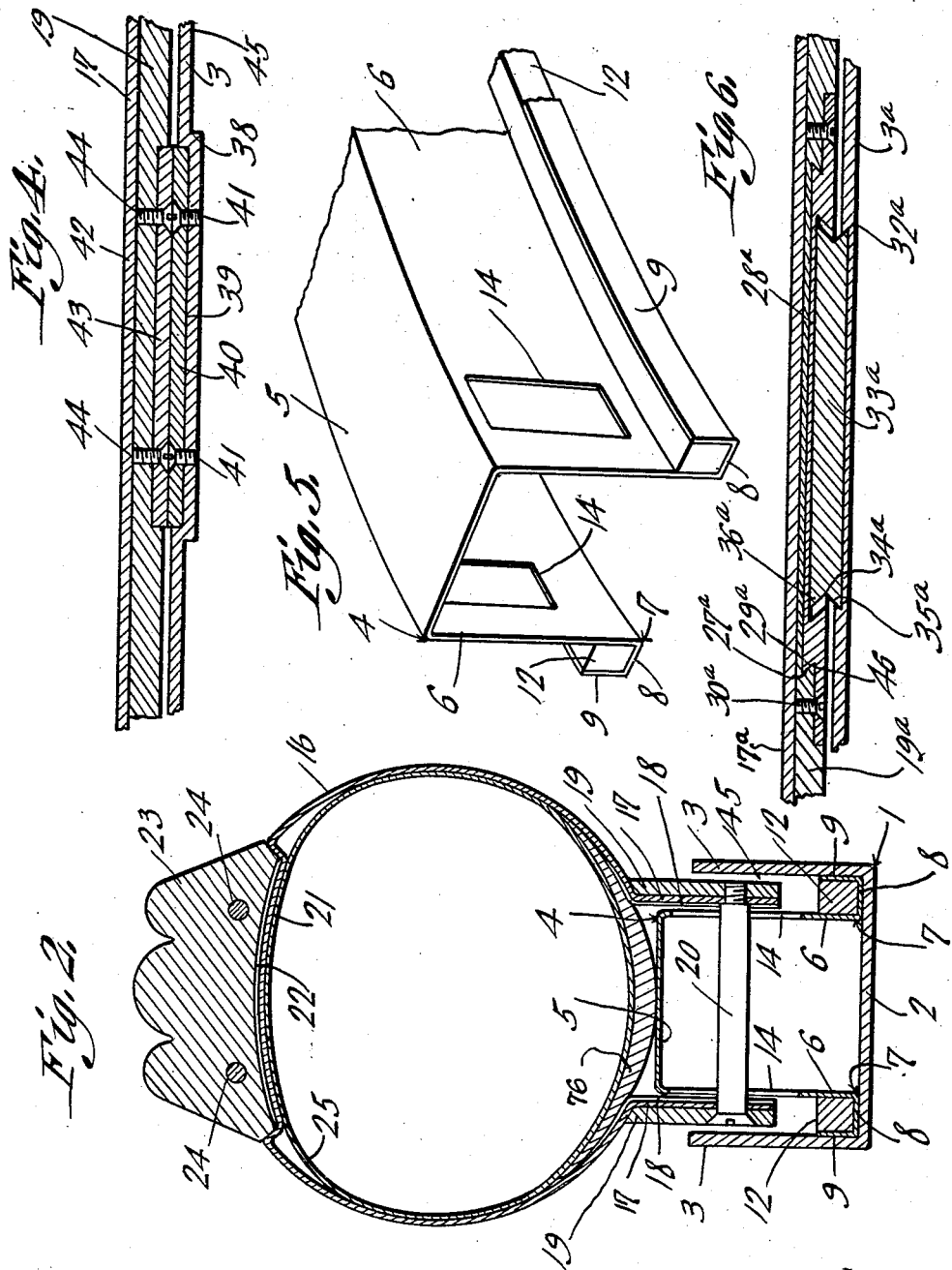

FURNEY F. GREEN, OF COALGATE, OKLAHOMA.

TIRE.

1,308,846.  Specification of Letters Patent.  Patented July 8, 1919.

Application filed April 13, 1918. Serial No. 228,404.

*To all whom it may concern:*

Be it known that I, FURNEY F. GREEN, a citizen of the United States, residing at Coalgate, in the county of Coal and State of Oklahoma, have invented a new and useful Tire, of which the following is a specification.

The device forming the subject matter of this application is a tire and one object of the invention is to provide novel means whereby the tire will be prevented from creeping with respect to the rim. Another object of the invention is to provide novel means for limiting the movement of the tire with respect to the rim. It is within the province of the disclosure to improve generally and to enhance the utility of devices of that kind to which the invention appertains. Changes such as a mechanic might make, may be resorted to, within the scope of what is claimed, without departing from the spirit of the invention.

In the drawings:—Figure 1 shows in side elevation, a device constructed in accordance with the invention, parts being broken away; Fig. 2 is a cross section on the line 2—2 of Fig. 1; Fig. 3 is a section on the line 3—3 of Fig. 1; Fig. 4 is a section on the line 4—4 of Fig. 1; Fig. 5 is a perspective showing a portion of the support; Fig. 6 is a section corresponding to Fig. 3 but showing a modification.

In carrying out the invention, there is provided a rim 1 including a base 2 and side flanges 3. Disposed between the flanges 3 are inverted trough-shaped supports 4, there being preferably four of these supports, arranged end to end about the rim. Each support includes a tread portion 5 and side flanges 6, the edges of the flanges being formed into troughs 7, each comprising a base 8 and a side flange 9. The bases 8 rest upon the base 2 of the rim 1, the side flanges 9 coöperating with the flanges 3 of the rim 1. Between the ends of the support 4, the troughs 7 are cut away as shown at 10 to form openings 11. Rubber buffer strips are seated in the troughs 7, the strips being shown at 12. Openings 14 are formed in the side flanges 6 of the support 4.

The numeral 15 denotes a metal tire which may have some resiliency. The tire comprises a body 16 and parallel wings 17 received between the parts 6 of the support 4 and the parts 3 of the rim 1. Transverse corrugations 18 are formed on the wings 17 of the tire 15 and are extended upon the body 16 of the tire. The corrugations 18 strengthen the tire and serve to take up the metal when the tire is bent into circular form. Reinforcing rings 19 are secured to the outer surfaces of the wings 17 of the tire 15, preferably by spot-welding. The ends of connecting devices 20 are mounted in the rings 19 and pass through the wings 17 of the tire 15. The connecting devices 20 move in the openings 14 of the support 4. The tread portion of the tire body 16 is provided with a depressed seat 21 the base of which is supplied with transverse corrugations 22. A tread 23, preferably made of rubber, is mounted in the seat 21 and coöperates with the corrugations 22, to avoid creeping. The tread 23 may be provided with reinforcing wires 24.

A cushion 25 preferably in the form of a pneumatic tube is located in the body 16 of the tire 15 and a shoe 76 coöperates with the tube 25, the shoe resting on the part 5 of the support 4, the cushion carrying an inflating tube 26 extended through the part 5 of the support 4 and through the base 2 of the rim 1. The cushion 25 supports the tire 15 yieldingly but when the cushion gives to a sufficient extent, the edges of the rings 19 and the wings 17 of the tire come into contact with the buffer strips 12 in the troughs 7.

The reinforcing rings 19 are provided on their outer sides with undercut recesses 27 which are oppositely disposed, there being ordinarily but one pair of these recesses. Plates 28 are disposed in the recesses 27 and have beveled ends 29 coöperating with the undercut ends of the recesses, the plates being held in place by securing elements 30 engaging the rings 19. Undercut recesses 31 are formed in the plates 28, and undercut recesses 32 are formed in the side flanges 3 of the rim 1. Strips 33 are provided, the same having notches 34 in their extremities, the notches forming beveled parts 35 and beveled parts 36 at the ends of the strips. The beveled parts 35 coact with the undercut ends of the recesses 32 in the side flanges 3, the beveled parts 36 being slidably received in the undercut recesses 31 of the plates 28 as clearly disclosed in Fig. 3. The strips 33 are secured to the side flanges of the rim 1 by securing elements 37. The parts above described, and shown in Fig. 3 prevent the tire 15 from creeping on the rim 1. The plates 33 extend into the openings 11 in the troughs 7.

The side flanges 3 of the rim 1 are struck outwardly at intervals as shown at 38 to form internal seats 39 in which are mounted wear plates 40 held in place by securing elements 41. Recesses 42 are formed in the rings 19 and wear plates 43 are held in the recesses 42 by securing elements 44, the wear plates 44 and 40 coöperating to space the reinforcing rings 19 of the tire from the side flanges 3 of the rim 1 as shown at 45.

In the modification shown in Fig. 6, parts hereinbefore alluded to have been designated by numerals already used, with the suffix "a." In this form of the invention, the strip 33ª has thinned ends 46 received in depressions 47 in the ring 19ª.

I claim:—

1. In a device of the class described, a rim comprising a base and side flanges; an inverted trough-shaped support located between the side flanges of the rim and including a tread and side flanges, the edges of the side flanges of the support being fashioned into troughs including bases resting on the base of the rim, and side flanges coöperating with the side flanges of the rim; buffer strips seated in the troughs; a tire including wings slidable between the side flanges of the rim and the side flanges of the support and alined with the buffer strips; and a cushion interposed between the support and the tread portion of the tire, the wings of the tire coacting with the buffer strips when the cushion yields.

2. In a device of the class described, a rim comprising a base, and side flanges provided with terminally undercut recesses; a tire including wings received slidably between the flanges of the rim; reinforcing rings secured to the wings of the tire and having terminally undercut recesses; plates fitting in the recesses of the rings and secured therein, the plates having beveled portions coöperating with the undercut ends of the recesses in the rings, the plates having terminally undercut recesses; strips having notches in their ends defining sets of oppositely beveled parts, the parts of one set engaging the undercut ends of the recesses in the side flanges of the rim, and the parts of the other set coöperating slidably with the undercut ends of the recesses in the plates; means for securing the strips to the side flanges of the rim; and means for supporting the tire yieldingly with respect to the rim.

3. In a device of the class described, a rim comprising a base and side flanges; a tire including a body, and wings received slidably between the side flanges of the rim, the wings having transverse corrugations extended upon the side portions of the body of the tire and terminated in spaced relation to the tread of the tire; and means for supporting the tire yieldingly with respect to the rim.

In testimony that I claim the foregoing as my own, I have hereto affixed my signature in the presence of two witnesses.

FURNEY F. GREEN.

Witnesses:
IVY E. SIMPSON,
PHILOMENA A. ROCKELLI.

Copies of this patent may be obtained for five cents each, by addressing the "Commissioner of Patents, Washington, D. C."